United States Patent [19]

Daio et al.

[11] Patent Number: 4,965,148
[45] Date of Patent: Oct. 23, 1990

[54] PACKED BATTERIES AND METHOD OF MAKING THE SAME

[75] Inventors: Fumio Daio, Nara; Yukimasa Niwa; Kenji Yoshida, both of Osaka, all of Japan

[73] Assignee: Matsushita Electric Industrial Co., Ltd., Japan

[21] Appl. No.: 413,403

[22] Filed: Sep. 27, 1989

[30] Foreign Application Priority Data

Sep. 28, 1988 [JP] Japan .................. 63-243018

[51] Int. Cl.$^5$ ............................ H01M 6/42
[52] U.S. Cl. .................. 429/159; 29/623.1
[58] Field of Search .......... 429/99, 158, 159; 29/623.1, 623.2, 623.4

[56] References Cited

U.S. PATENT DOCUMENTS

| | | | |
|---|---|---|---|
| 2,209,927 | 7/1940 | Nichols | 429/159 |
| 3,486,945 | 12/1969 | O'Donnell et al. | 429/159 |
| 3,736,189 | 5/1973 | Ciliberti | 429/159 |
| 4,407,911 | 10/1983 | Hooke | 429/159 |
| 4,806,440 | 2/1989 | Hahs et al. | 429/159 |

FOREIGN PATENT DOCUMENTS 60-160465 10/1985 Japan .
61-39861 3/1986 Japan .

Primary Examiner—Donald L. Walton
Attorney, Agent, or Firm—Lowe, Price, Leblanc, Becker & Shur

[57] ABSTRACT

A packed battery includes a frame composed of a pair of substantially I-shaped frame members molded of synthetic resin and joined together to hold therein a power generating elements composed of a plurality of series-connected cells, and an end cap molded of synthetic resin and joined with the frame to close an open end of the frame. One of the frame members has in its one end face a pair of apertures through which a pair of external terminals is inserted for connection to positive and negative terminal end faces of the power generating element. With this construction, the packed battery has a high capacity per unit volume and the external terminals and the positive and negative terminal end faces can be welded easily and efficiently. Accordingly, the packed battery can be manufactured at a high rate of production.

9 Claims, 7 Drawing Sheets

PACKED BATTERIES AND METHOD OF MAKING THE SAME

BACKGROUND OF THE INVENTION

1. Field of the Invention

The present invention relates to a packed battery used as a power source for portable appliances such as cameras or a backup power supply for memories in electronic apparatus. It also relates to a method of making such packed battery.

2. Description of the Prior Art

Packed batteries of the type described are known as disclosed, for example, in Japanese Utility Model Laid open Publication Nos. 60-16045 and 61-39861. The disclosed packed batteries comprise a split case formed of synthetic resin, and a power generating element composed of a plurality of cylindrical cells connected in series and disposed within an interior space defined by two halves of the split case. Positive and negative terminals are exposed to an upper surface of the split case for permitting the electric current to be drawn from the packed battery.

Figure 7:
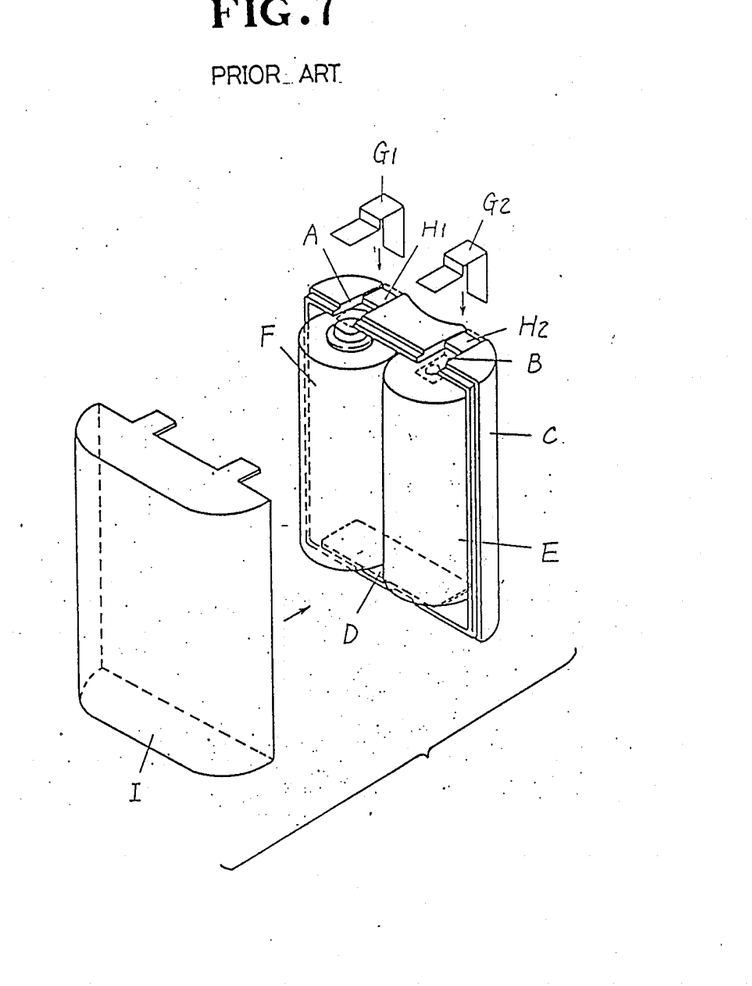
FIG. 7 is an exploded perspective view of a conventional packed battery.

In the manufacture of the known packed batteries, as shown in FIG. 7 of the accompanying drawings, it has been customary practice to first place in one case member C of a split case having a pair of cutout recesses A, B of the same width as positive and negative terminals G1, G2, a power generating element composed of a plurality of cells E, F connected in series by a conductive connector D or a conductor having a positive temperature coefficient (PTC) layer or device which has previously been welded to the bottom ends of the respective cells. Then, the positive and negative terminals G1, G2 of about 4 mm thick are set in retainer recesses H2, H1 of the case member C and electrically connected by resistance welding to the top terminal end faces of the respective cells F, E. Finally, the other case member I is assembled with the case member C to fully encase the power generating element and the two case members C, I are bonded together to complete a packed battery.

In recent years, the appliances employing the packed batteries have found a wide variety of applications which then have brought about an increasing desire for a packed battery capable of meeting requirements including a large capacity, a large welding strength against shock or impact forces tending to detach the terminals, and a simple welding of the terminals to the top terminal end faces of the respective cells to improve the productivity. The conventional packed batteries of the foregoing construction and the method of making the same are however not satisfactory for the reasons described below. Since cutout recesses A, B in the case C have the same width as the terminals G1, G2, there is provided only a small space available for receiving an electrode head of a welder when the terminals G1, G2 are welded to the cells E, F. This small space needs a specifically designed welder head and a complicated setting of the welding positions of an automated packed battery manufacturing machine. Furthermore, the individual cells E, F are completely received in the split case, so that the capacity per unit volume of the battery is necessarily reduced to a certain extent depending on the thickness of the split case. With this fully encased construction, the conventional packed batteries fail to meet the desire for a large capacity packed battery.

SUMMARY OF THE INVENTION

With the foregoing difficulties in view, an object of the present invention is to provide a packed battery which has a large capacity per unit volume and a terminal welding strength large enough to withstand shock or impact forces tending to detach the terminals, and enables a simple welding operation to join the terminals to terminal end faces of the individual cells, thus improving the productivity of the packed battery.

Another object of the present invention is to provide a method of making such packed battery.

According to the present invention, a packed battery comprises a power generating element including a plurality of cylindrical cells disposed side-by-side and electrically connected in series by a conductive connector, and an adhesive-backed labeling sheet member wrapped around the peripheries of the respective cylindrical cells. A frame holds therein the power generating element and is composed of a pair of generally I-shaped frame members molded of synthetic resin and joined together to define therebetween a substantially hollow space with one end open for receiving therein the power generating element, and an end ca molded of synthetic resin and joined with the frame members to close the open end of the frame. A pair of terminals is attached to one of the frame members, each of the terminals having one end connected to one of two terminal ends of the power generating element. The other end of the terminal is exposed to the outside of the frame for permitting electric current to be drawn from the power generating element.

To make the packed battery stated above, a plurality of cylindrical cells ar bonded together in side-by-side with an adhesive and they are electrically connected in series by a conductive connector. The cylindrical cells are wrapped on their peripheries with an adhesive-backed labeling sheet member, thereby completing a power generating element. The power generating element is held between a pair of generally I-shaped frame members molded of synthetic resin. The two frame members are joined together by ultrasonic welding, thereby firmly holding the power generating element in a frame composed of the thus-joined frame members. A pair of terminals of a generally 7 shaped configuration is attached to one of the frame members by first inserting respective one end portions of the terminals into the one frame member through apertures defined in the one frame member until the one end portions engage two terminal end faces of the power generating element and respective other end portions of the terminals are fitted in retainer recesses in the one frame, then welding the one end portions of the terminals to the terminal end faces of the power generating element to thereby connect the terminals and the power generating element. An end cap molded of synthetic resin is fitted into an open end of the frame to close the same with the opposite end portions of the terminals firmly gripped by and between the end cap and the one frame member of the frame. Finally, the end cap and the frame is integrally fused together by ultrasonic welding.

Many other advantages and features of the present invention will become manifest to those versed in the ar upon making reference to the detailed description and the accompanying sheets of drawings in which preferred structural embodiments incorporating the principles of the present invention are shown by wa of illustrative example.

DESCRIPTION OF THE PREFERRED EMBODIMENTS

Figure 1:
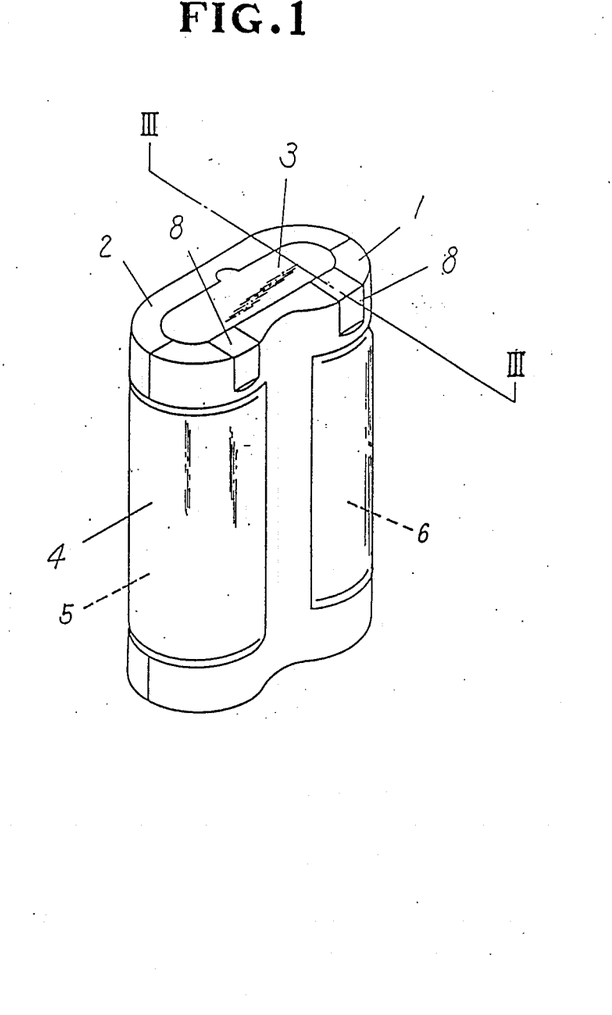
FIG. 1 is a perspective view of a packed battery according to the present invention.
Figure 2:
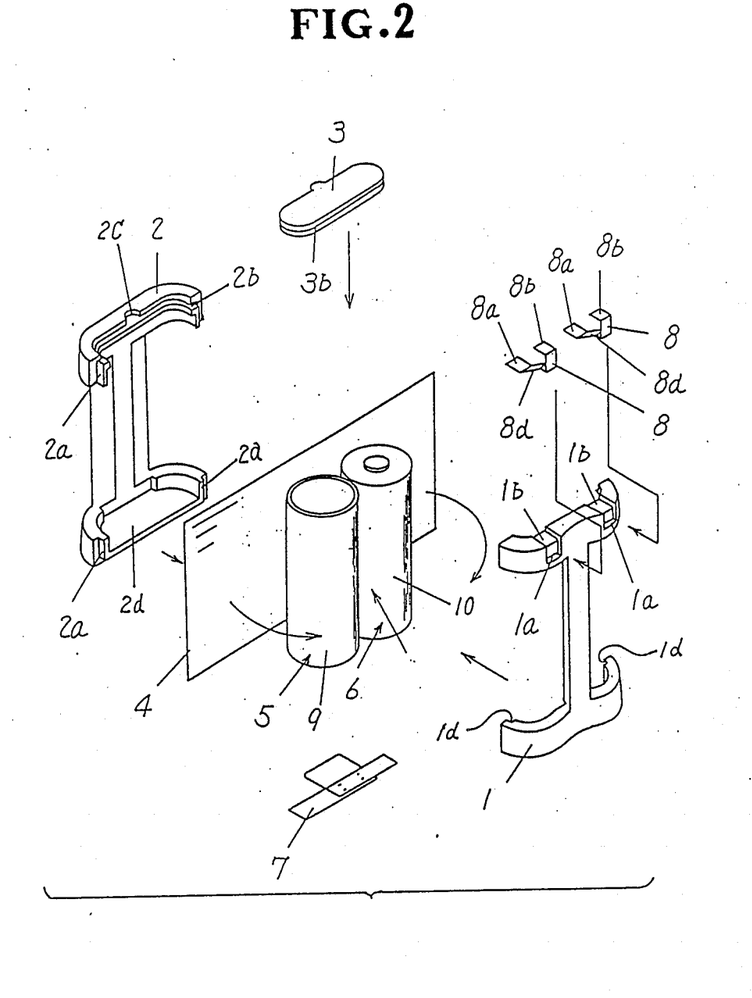
FIG. 2 is an exploded perspective view, on reduced scale, of the packed battery, explaining a method of making the same packed battery according to the present invention.

Referring now to the drawings, wherein like reference characters designate like or corresponding parts throughout the several views, FIGS. 1 and 2 show a packed battery according to the present invention.

The packed battery includes a frame composed of a pair of generally I-shaped first and second frame members 1, 2 and an end cap 3 assembled together to hold a power generating element in the frame. The power generating element is composed of a plurality (two in the illustrated embodiment) of cylindrical cells 5, 6 (FIG. 2) disposed in side-by-side juxtaposition and joined by an adhesive-backed labeling sheet member 4 extending over and around the peripheries of the respective cylindrical cells 5, 6. The cells 5, 6 are electrically connected in series by a conductive connector 7 or a connector having a positive temperature coefficient (PTC) thermistor, the connector being joined with the bottom terminal end faces of the respective cells 5, 6. One example of such a PTC thermistor is PSR 20732 manufactured by Raychem Corporation of Calif. U.S.A. Two terminals 8 are attached to the top end of the frame member 1 and held in contact with the top terminal end faces of the respective cells 5, 6 so that the electric current can be drawn through the terminals 8. The I-shaped first and second frame members 1, 2 are molded of synthetic resin and assembled together to jointly define therebetween a hollow space with a top end open for receiving therein the power generating element. The open top end of the frame is closed by the end cap 3 which is also molded of synthetic resin. The end cap 3 also serve to keep outer ends of the respective terminals 8 in position against displacement, as described later.

Figure 3:
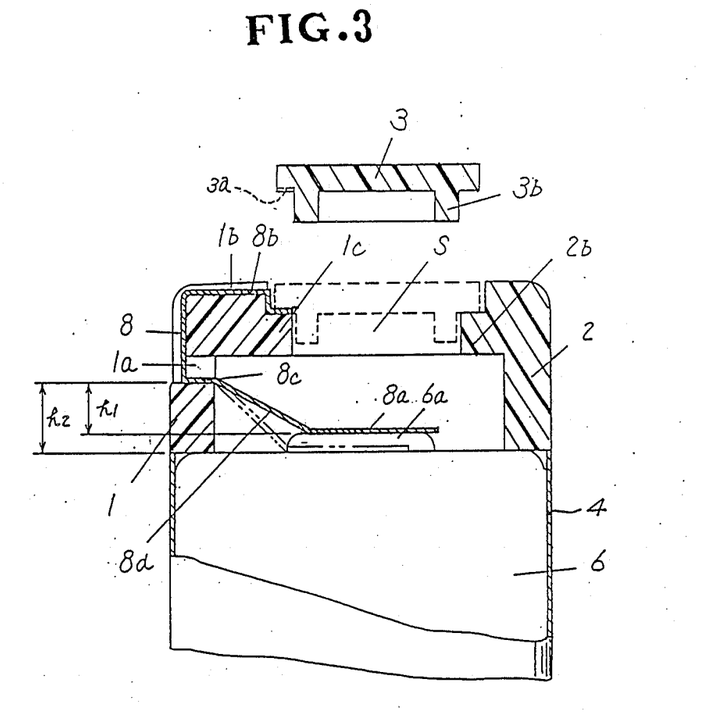
FIG. 3 is a fragmentary cross-sectional view taken along line III—III of FIG. 1.
Figure 4:
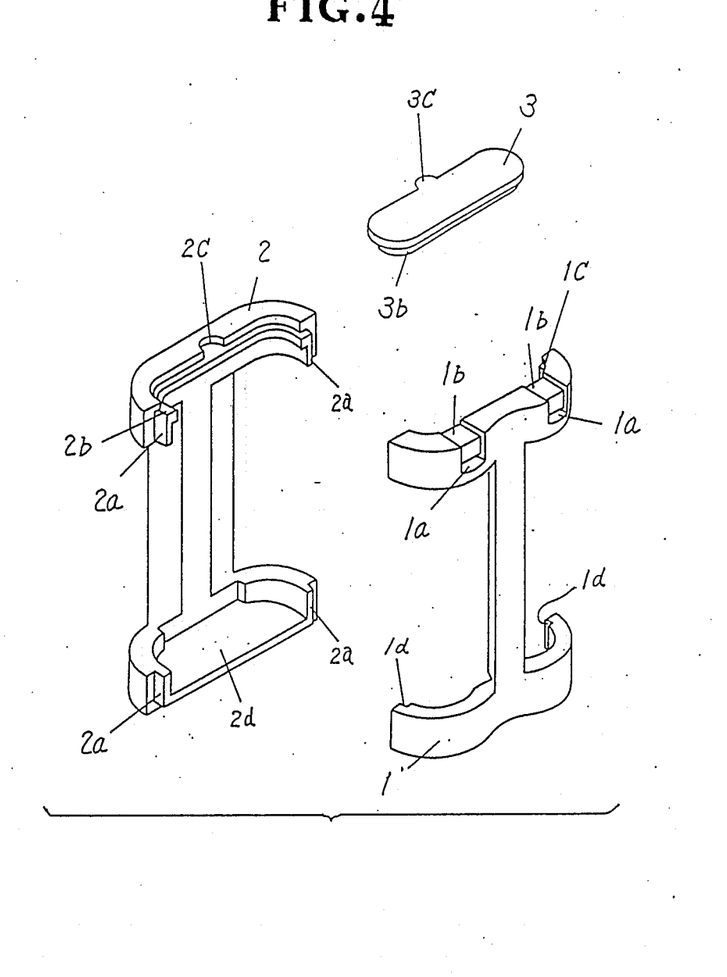
FIG. 4 is an exploded perspective view showing a frame of the packed battery which is composed of a pair of molded frame halves or members and a molded end cap.

As shown in FIG. 2, the I-shaped first frame member 1 includes an upper horizontal arm bent arcuately and having a pair of laterally spaced horizontal apertures 1a, a extending therethrough for the passage of the respective terminals 8, and a pair of inverted L-shaped retaining recesses 1b, 1b extending in the outside surface of the upper horizontal arm contiguously from the respective apertures 1a for holding therein portions of the respective terminals 8. The top surface of the horizontal arm is recessed so as to form a horizontal shoulder 1c (FIGS. 3 and 47) projecting inwardly for supporting thereon the end cap 3 when the packed battery is assembled. Though not shown, the lower horizontal arm of the first frame member 1 has a bottom plate extending parallel to the shoulder 1c for supporting thereon the cells 5, 6.

The I-shaped second frame member 2 is of the generally identical structure t the I-shaped first frame member 1 and includes two pairs of laterally spaced locking projections 2a extending forwardly from opposite ends of upper and lower horizontal arms of the frame member 2. The locking projections 2a are fitted in mating recesses 1d formed in the opposite ends of the respective arms of the first frame member 1 when the two frame members 1, 2 are joined together as described later. The upper horizontal arm of the second frame member 2 is recessed in its top surface so as to form a horizontal shoulder 2b for supporting thereon the end cap 3. The recessed top surface also has a semicircular guide recess 2c for receiving a guide projection (described later) of the cap 3. The lower horizontal arm of the second frame member 2 has a bottom plate 2d extending parallel to the shoulder 2b for supporting thereon the cells 5, 6.

Figure 5A:
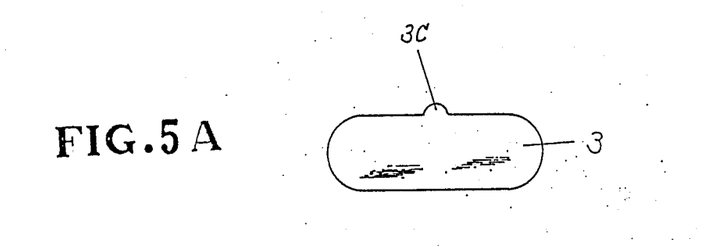
FIG. 5A is a plan view of the end cap.
Figure 5B:
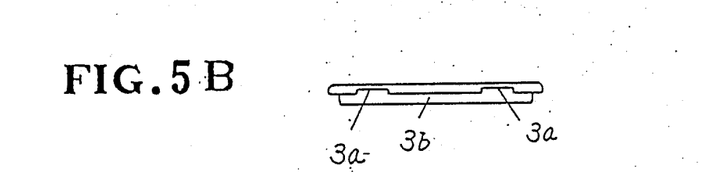
FIG. 5B is a front elevational view of the end cap.
Figure 5C:
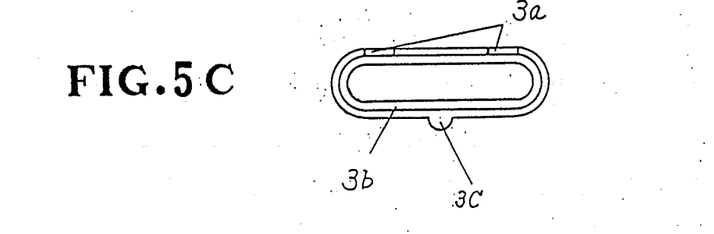
FIG. 5C is a bottom view of the end cap.

The end cap 3, as shown in FIGS. 5A through 5C, has a pair of laterally spaced guide recesses 3a, 3a in its under surface for receiving therein portions of the respective terminals 8, and an annular central projection 3b on the under surface. The projection 3b is receivable in an opening defined by the shoulders 1c, 2b (FIGS. 2 and 4) of the first and second frame members 1, 2. The guide recesses 3a have a depth slightly smaller than the thickness of the terminals 8 for a reason described later. The end cap 3 further has a semicircular guide projection 3c projecting edgewise and complementary in contour to the shape of the guide recess 2c (FIGS. 2 and 4) of the second I-shaped frame member 1.

As shown in FIG. 2, each of the cylindrical cells 5, 6 is covered with a tubular sheathing 9, 10 of polyvinyl chloride. The opposite terminal end faces of the respective cells 5, 6 remain uncovered or exposed. Each of the terminals 8 is formed of a resilient strip of metal bent into a generally inverted horizontal 7-shaped configuration. The generally 7-shaped terminal 8 includes, as shown in FIG. 3, a flat inner end portion 8a engageable with the top terminal end face 6a of a corresponding one 6 of the cells 5, 6, a generally L-shaped outer end portion 8b fitted in a corresponding one 1b of the first frame member 1, an intermediate support portion 8c contiguous to the outer end portion 8b and received in the aperture 1a, and an inclined portion 8d interconnecting the support portion 8c and the inner end portion 8a. With this construction, when the terminal 8 is attached to the frame, the inclined portion 8d is resiliently deformable about the support portion 8c so that the inner end portion 8a is displacable in a direction parallel to a central axis of the cylindrical cell 6. The extent of displacement of the flat end portion 8a of the terminal 8 is at least equal to the difference between a first distance $h1$ between the support portion 8c and the top end face of a negative terminal and a second distance $h2$ between the support portion 8c and the top end face of a positive terminal 6c.

The packed battery of the foregoing construction is made in a manner as described below.

The cylindrical cells 5, 6 wrapped with the tubular sheathings of polyvinyl chloride are disposed side-by-side and bonded together by an adhesive (not shown). Then the bottom end faces of the respective cylindrical cells 5, 6 are joined by resistance welding to a conductive connector to thereby electrically connect the two cells in series. Thereafter, the adhesive-backed labeling sheet member 4 is wrapped around the peripheries of the respective cylindrical cells 5, 6. A power generating element is thus completed.

The power generating element composed of the sheathed cylindrical cells 5, 6 is placed in one of the first and the second frame members 1 or 2. The other frame member 2 or 1 is placed over the power generating element, then forced against the one frame member 1 or 2, so that the two frame members 1, 2 are pre-assembled together through engagement between the recesses 1d in the first frame member 1 and the locking projections 2a on the second frame member 2. The engagement portions of the thu pre-assembled frame members 1, 2 are fused together by a ultrasonic welder to thereby permanently join the first and second frame members 1, 2, with the power generating element firmly held between the first and second frame members 1, 2

Thereafter, the two terminals 8 are attached to the first frame member 1 in a manner as shown in FIG. 3. In attachment, the terminals 8 are first held in a posture to assume an inverted horizontal 7 shape. While keeping this posture, the terminals 8 are then inserted through the apertures 1a into the frame until the inverted L-shaped outer end portions 8b of the respective terminals 8 are snugly fitted in the retaining recesses 1b of the first frame member 1. In this instance, the flat inner ends 8a of the respective terminals 8 are held in pressure contact with corresponding ones of the top terminal end faces (only one shown at 6a in FIG. 3) of the cells 5, 6. This is because due to the resiliency of the inclined portions 8d, the inner end portions 8a are resiliently displacable to accommodate the difference in level (h2–h2) between the positive terminal end face 6a and the negative terminal end face of the cells 5, 6. Then the inner end portions 8a of the terminals 8 and the top terminal end faces of the cells 5, 6 are joined together by resistance welding. The resistance welding is achieved stably and reliably with utmost ease because a relatively large space S is provided for the passage of a non-illustrated electrode head of a resistance welder. With this relatively large space S defined in the open top end of the frame, the electrode head is readily movable through the space S into accurate pressure contact with the inner end portions 8a of the terminals 8 without interference with the frame. The inner end portions 8a are closely fitted with the terminal end faces of the cells 5, 6 without an air gap therebetween which would otherwise result in sparking at welding operation and an uneven welding strength.

Then, the end cap 3 is fitted into the open top end of the frame to close the same. In this instance, endmost parts of the respective outer end portions 8b of the terminals 8 are received in the guide recesses 3a of the end cap 3. Since the depth of the guide recesses 3a is slightly smaller than the thickness of the terminals 8 as described above, the endmost parts of the outer end portions 8b are firmly gripped by and between the end cap 3 and the the shoulder 1c of the first frame member 1. The outer end portions 8b are thus locked in position against displacement. Partly because the annular projection 3b fitted in an opening defined by the shoulders 1c, 2b of the first and second frame members 1, 2, and partly because the semicircular guide projection 3c fitted in the semicircular guide recess 2c in the second frame member 2, the end cap 3 can be set on the frame without wobbling. The guide projection 3c is particularly useful when combined with a marking (not shown) indicative of th polarity of the battery. With this combination of the guide projection 3c and the polarity marking, it is possible to avoid a failure of polarity indication caused by the cells loaded in a wrong direction. The end cap 3 is finally fused by ultrasonic welding to the frame, thereby completing a packed battery.

Figure 6A:
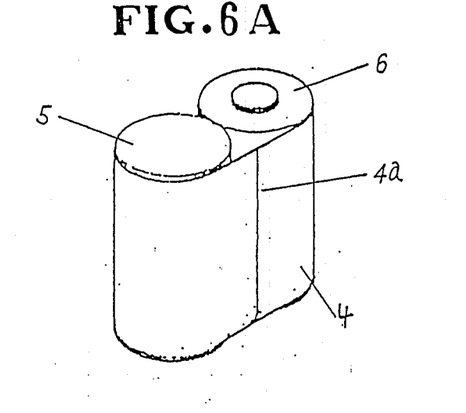
FIGS. 6A and 6B are perspective views showing the manner in which two series-connected cells of a power generating element are covered on their substantially entire peripheries with a adhesive-backed labeling sheet member.
Figure 6B:
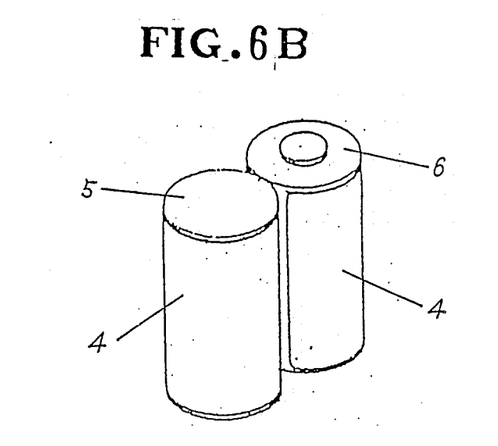

FIGS. 6A and 6B show another form of wrapping of the cylindrical cells 5 6 with an adhesive-backed labeling sheet member 4. The adhesive-backed labeling sheet member 4 is wrapped around the peripheries of the two cells 5, 6 in such a manner that a central portion 4a extends tangentially between the two cells 5, 6, as shown in FIG. 6A. Then the labeling sheet member 4 is transversely severed at the central portion 4a into two labeling sheet member pieces. The severed edge portions of the respective labeling sheet member pieces are bonded to the peripheries of the respective cylindrical cells 5, 6, as shown in FIG. 6B.

As described above, the frame of the packed battery of the present invention is composed of two generally I-shaped frame members and hence the power generating element is not fully concealed in the frame, as opposed to the power generating element of the conventional packed battery shown in FIG. 7. Accordingly, the packed battery of the present invention has a greater effective volume than the conventional packed battery. The capacity of the present packed battery is 1.20 to 1,40 times as large as the conventional packed battery of the same volume. The present packed battery and the conventional packed battery were tested for the terminal welding strength.

The number of test samples was 500 for each battery. The 500 test samples ware dropped five times at random order from the position of 1 m from the level of a plastic tile, then observed for a conduction failure caused by detachment of the terminal. No conduction failure was observed on the test samples of the present invention whereas 27 test samples of the conventional battery cause such conduction failure. Such a conduction failure-free welding of the terminals is achieved due mainly to a relatively large open top end provided in the frame for the passage therethrough of an electrode head of the resistance welding machine. With this large open end, the electrode head can be accurately positioned on the terminal inner end, has an increased degree of freedom of design, and is capable of performing welding operation efficiently. Furthermore, due to the resiliency of the terminal, the inner end portion of the terminal is resiliently urged into pressure contact with the terminal end face of each cell and can be displacable to accommodate the difference in level between the positive and negative terminal ends of the adjacent cells. Accordingly, the inner end portion of the terminal and the terminal end face of the cell are welded stably and reliably in a closely fitted condition. The outer end of the terminal is integrally molded with the frame at the same time the end cap is ultrasonically welded to the frame members, with an endmost part of the outer end portion firmly gripped by and between th end cap and one of the frame members. Thus the terminal is firmly locked in position against detachment. Furthermore, in the course of manufacture of the packed battery, the cells can be transported and stored as they are retained in the frame. The packed battery having such framed cells is therefore suited for an assembly system on the division of work bases.

Obviously, various modifications and variations of the present invention are possible in the light of the above teaching. It is therefore to be understood that within the scope of the appended claims the invention may be practiced otherwise than as specifically described.

What is claimed is:

1. A packed battery comprising:
   (a) a power generating element including a plurality of cylindrical cells disposed side-by-side and electrically connected in series by a conductive connector, and an adhesive-backed labeling sheet member wrapped around the peripheries of the respective cylindrical cells;
   (b) a frame holding therein said power generating element and composed of a pair of generally I-shaped frame members molded of synthetic resin and joined together to define therebetween a substantially hollow space with one end open for receiving therein said power generating element, and an end cap molded of synthetic resin and joined with said frame members to close said open end; and
   (c) a pair of terminals attached to one of said frame members, each said terminal having one end connected to one of two terminal ends of said power generating element, the other end of said terminal being exposed to the outside of said frame for permitting electric current to be drawn from the power generating element.

2. A packed battery as claimed in claim 1, wherein said one frame member has a pair of apertures for the passage therethrough of the respective terminals, and an inverted L-shaped retainer recesses extending contiguous to the respective apertures and retaining respectively therein said terminals.

3. A packed battery as claimed in claim 1, wherein each said terminal is formed of a resilient strip of metal bent into a generally 7 shape, said one end portion of said generally 7-shaped terminal being flat, the other end portion of said generally 7-shaped terminal having a generally L shape and including an endmost part firmly gripped by and between said end cap and said one frame, said generally 7-shaped terminal having an inclined portion contiguous to said flat one end and urging said flat one end into pressure contact with a terminal end face of said power generating element.

4. A packed battery as claimed in claim 3, wherein said end cap has a pair of guide recesses receiving therein said endmost parts of the other ends of the respective terminals, the guide recesses having a depth slightly smaller than the thickness of said terminals.

5. A packed battery as claimed in claim 1, wherein said cells are wrapped with said adhesive-backed labeling sheet member substantially o their entire peripheries except those portions concealed by said I-shaped frame members.

6. A packed battery as claimed in claim 1, wherein said connector comprises a positive temperature coefficient thermistor.

7. A packed battery as claimed in claim 1, wherein one of said frame members has a guide recess opening to said open end, said end cap having a guide projection complementary in contour to the shape of said guide recess and receivable in said guide recess.

8. A method of making a packed battery including a power generating element having a plurality of cylindrical cells disposed side-by-side and electrically connected in series by a conductive connector, and an adhesive-backed labeling sheet member wrapped around the peripheries of the respective cylindrical cells, a frame holding therein the power generating element and composed of a pair of generally I-shaped frame members molded of synthetic resin and joined together to define therebetween a substantially hollow space with one end open for receiving therein the power generating element, and end cap molded of synthetic resin and joined with the frame members to close the open end, and a pair of terminals attached to one of the frame members, each of the terminals having one end connected to one of two terminal ends of the power generating element, the other end of the terminal being exposed to the outside of th frame for permitting electric current to be drawn from the power generating element, said method comprising the steps of:
   (a) bonding with an adhesive a plurality of cylindrical cells together in side-by-side;
   (b) electrically connecting the cylindrical cells in series by a conductive connector;
   (c) wrapping the cylindrical cells on their peripheries with an adhesive-backed labeling sheet member, thereby completing a power generating element;
   (d) holding the power generating element between a pair of generally I-shaped frame members molded of synthetic resin and ultrasonically fusing the two frame members together to thereby join them with the power generating element firmly held in a frame composed of the thus-joined frame members;
   (e) attaching a pair of terminals of a generally 7 shaped configuration to one of the frame members by first inserting respective one end portions of the terminals into the one frame member through apertures defined in the one frame member until the one end portions engage two terminal end faces of the power generating element and respective other end portions of the terminals are fitted in retainer recesses in the one frame, then welding the one end portions of the terminals to the terminal end faces of the power generating element to thereby connect the terminals and the power generating element; and
   (f) fitting an end cap molded of synthetic resin into an open end of the frame to close the same with the opposite end portions of the terminals firmly gripped by and between the end cap and the one frame member of the frame, then ultrasonically fusing the end cap and the frame members to thereby join them integrally.

9. A method as claimed in claim 8, wherein said wrapping of the cylindrical cells is achieved by first covering the cylindrical cells with the adhesive-backed labeling sheet member in such that a central portion of the labeling sheet member extends tangentially between the cells, then transversely severing the labeling sheet member at the central portion, and finally bonding the severed edge portions of the labeling sheet- member to the peripheries of the respective cells.

* * * * *